Dec. 31, 1968     M. H. PELAVIN     3,419,879
MULTIPLE CHANNEL ANALYSIS SYSTEM WITH PEAK DETECTION
Filed Nov. 2, 1964
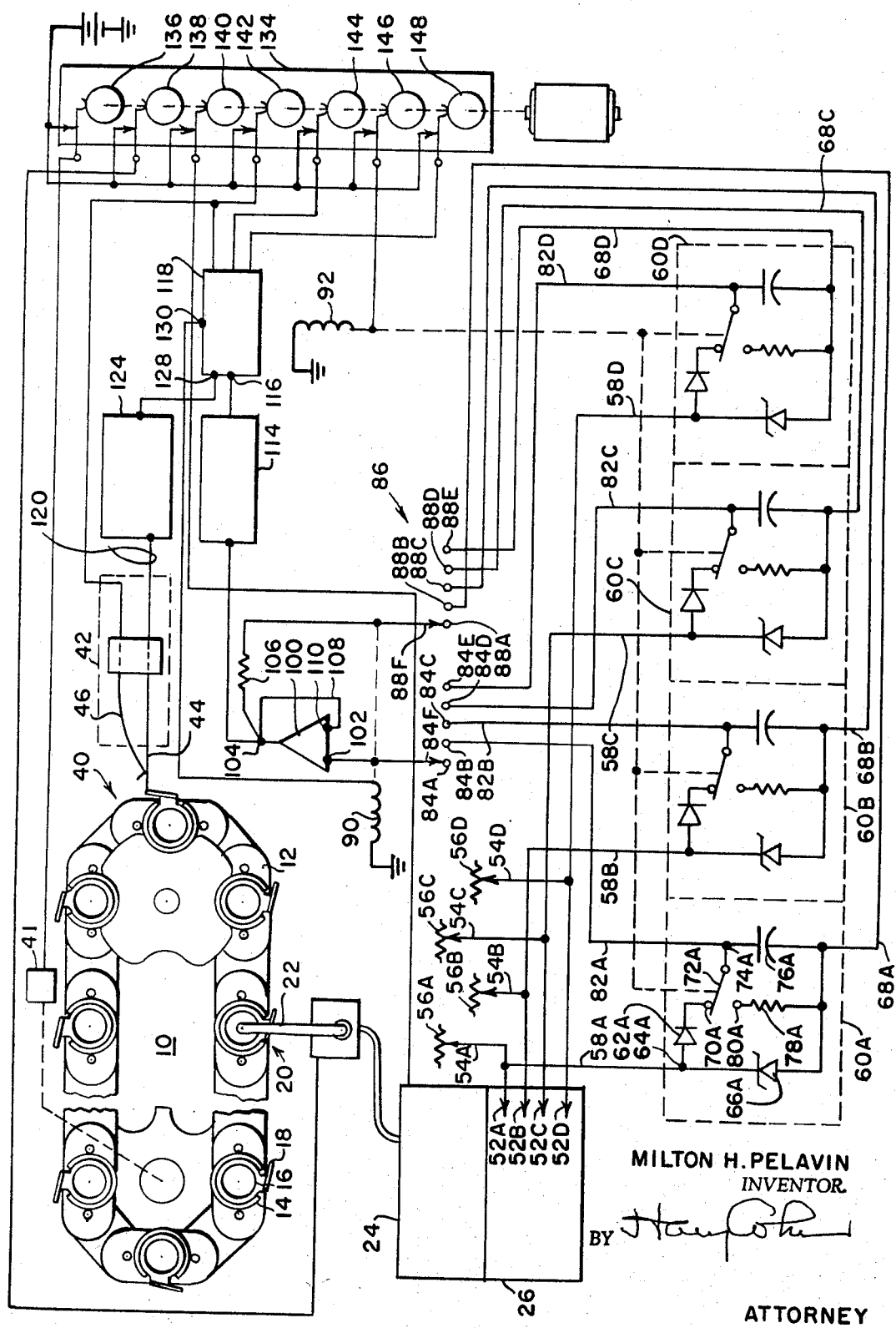
MILTON H. PELAVIN
INVENTOR.
BY
ATTORNEY United States Patent Office 3,419,879
Patented Dec. 31, 1968

3,419,879
MULTIPLE CHANNEL ANALYSIS SYSTEM WITH PEAK DETECTION
Milton H. Pelavin, Greenburgh, N.Y., assignor to Technicon Cororation, a corporation of New York
Filed Nov. 2, 1964, Ser. No. 408,026
8 Claims. (Cl. 346—33)

ABSTRACT OF THE DISCLOSURE

A sequential sample, multichannel, liquid flow, analytical system has a detector for each channel and a null-balance chart recorder cyclically coupled to each detector. A capacitor for each channel is coupled to the sliding tap of the balancing circuit for the recorder for detecting and storing the peak value of the curve plotted for that channel; a digital voltmeter is coupled to each capacitor for providing an analogue to digital conversion; and a digital recording device is coupled to said voltmeter.

---

This invention relates to recorders, and, more particularly, to apparatus for sequentially, digitally, recording the results of each of a group of concurrently run anlysis procedures.

Automatic analysis apparatuses are known wherein a plurality of sample substances are sequentially taken by the apparatus; formed into a continuous flow of liquid, each segment is sequentially processed and analyzed for several constituents; and the results of these analyses are recorded by a multi-trace curve plotter or recorder. Such an apparatus is disclosed in the U.S. patent application of Jack Isreeli and Milton H. Pelavin, S.N. 316,264, filed Oct. 15, 1963, and assigned to the assignee of this application.

It is an object of this invention to provide a method and an apparatus for digitally recording on a document the results of analyses performed on a sample segment.

It is another object of this invention to provide an apparatus for digitally recording on a document a unique sample identification number together with the results of the analyses performed on that sample.

A feature of this invention is the provision of a capacitor coupled to the sliding tap of a null-balance chart recorder for detecting and storing the peak value of the curve being plotted by the recorder; a digital voltmeter coupled to said capacitor for providing an analog to digital conversion; and a digital recording device coupled to said voltmeter.

These and other objects, features and advantages will become apparent by reference to the following description of the invention considered in conjunction with the accompanying drawing in which:

The figure is a diagrammatic view of a system embodying this invention.

In the drawing, a sampler 10 is shown, such as is disclosed in the U.S. Patent application of Jack Isreeli; S.N. 391,093, filed Aug. 21, 1964, and assigned to the assignee of this application. The sampler includes an endless sprocket chain 12 to which are mounted verticle, tubular, sample container carriers 14. A tubular sample container 16 is disposed in each carrier 14 and has a notched edge card 18 attached thereto by a boss which projects through a vertical slot in the carrier. The chain intermittently conveys each of the containers to a first station 20 at which a sample off-take tube 22 is located. A suitable sample tube which is translated in a given plane is shown in the U.S. patent application of Jack Isreeli and Theodore Bilichniansky, S.N. 246,967, filed Dec. 26, 1962, now Patent No. 3,251,229, and assigned to the assignee of this application.

The off-taken samples are supplied as a continuous stream to an automatic analysis apparatus 24 having a recorder 26. A suitable automatic analysis apparatus is shown in the U.S. patent application of Jack Isreeli and Milton H. Pelavin, S.N. 316,264, filed Oct. 15, 1963, and assigned to the assignee of this application. This apparatus by the use of calibrated potentiometers and calibrated chart paper provides a direct output reading in percentage concentration.

The operation of the analysis apparatus requires a finite time from start to finish, and the off-taken sample container is advanced from the first station 20 towards a second station 40 by a known motor and geneva gear mechanism 41. When the analysis is almost completed, the off-taken sample container is halted at the second station. A read-out mechanism 42, such as is disclosed in the Isreeli application, supra, having a plurality of spaced apart, parallel wires 44, is disposed at the second station. The wires engage the notched edge of the card 18. Those wires which are adjacent notches on the edge of the card 18, pass into these notches. Those wires which are adjacent lands on the edge of the card are deflected into contact with a ground bus 46. A potential is applied to the wires, and continuity to ground is established in each deflected wire. The notches are arranged in a predetermined code to provide the container with a unique identification number.

The analysis apparatus of the Isreeli et al. application supra, divides each sample segment into eight portions, reacts each portion for a specific ingredient, and then passes the portions to eight flow cells or other devices for measurement. Four of the portions are delayed in transit to the respective flow cells. Four optical benches are coupled to a four channel, four pen, chart recorder. The four optical benches, which include suitable light sources and light detectors, measure the optical density of the portions in the first group of flow cells and these results are recorded by the respective moving pens. The four benches are then shifted to measure the optical density of the second group of flow cells, now receiving the delayed four portions, and these results are recorded by the respective moving pens. The optical density of each portion is responsive to the concentration of the reacted-for ingredient. Should another device for measurement be used, by way of example but not limitation, such as a flame photometer, then a light detector in the flame photometer will measure light intensity at a given wavelength.

The four pens 52A, 52B, 52C and 52D of the recorder 26 are mechanically respectively coupled to the sliding taps 54A, 54B, 54C and 54D of four respective potentiometer resistances 56A, 56B, 56C and 56D, and are driven by four respective null-balance bridges, one for each channel. Four return conductors 58A, 58B, 58C and 58D are respectively coupled to the sliding taps 54 and are energized thereby to a potential which is responsive to the optical density of the sample portion. Non-linearities in this relationship may be compensated for by making the potentiometer non-linear as shown in the Isreeli et al. application, supra. Four peak potential storing circuits 60A, 60B, 60C and 60D are respectively coupled to the return conductors 58A, 58B, 58C and 58D.

Each peak potential storing circuit, for example, circuit 60A, includes a diode 62A, whose cathode is coupled at a junction 64A to the anode of a Zenner diode 66A, and whose cathode is coupled to a low potential conductor or floating ground conductor 68A. The anode of the diode 62A is coupled to a fixed contact 70A of a double throw switch 72A which is coupled at a junction 74A to one plate of a low loss capacitor 76A. The other plate of the capacitor is coupled to the low potential conductor 68A. A resistor 78A is coupled between the low potential conductor 68A and the other fixed contact 80A of the switch 72A. The junction 74A is coupled by a high potential conductor 82A to the second level contact 84B of the first bank of contacts 84A through 84E in a stepping switch 86. The low potential conductor 68A is coupled to the second level contact 88B of the second bank of contacts 88A through 88E of the switch 86. A sliding contact 84F for the first bank of contacts and a sliding contact 88F for the second bank of contacts are mechanically coupled and operated by a stepping solenoid 90. The double throw switches 72A, 72B, 72C and 72D are mechanically coupled and operated by a solenoid 92.

It will be seen that as each pen is operated by its associated null-balance bridge, the associated mechanically coupled thereto sliding tap 54 picks off a potential from the associated potentiometer resistance 56 which is responsive to the light intensity received by the light detector of the optical bench. This potential is coupled through the diode 62, the fixed contact 70, the moving contact 72, to the anode of the capacitor 76. The potential stored across the capacitor 76, with respect to the low potential or floating ground conductor 68, rises to follow the curve being plotted by the associated pen to the maximum value being plotted. When the curve being plotted by the pen falls, the potential stored across the capacitor does not fall to follow the curve, as the capacitor 76 cannot discharge back across the diode 62. Thus the capacitor stores a potential responsive to the maximum value plotted by the recorder. The capacitor may advantageously be made with a dielectric of polystyrene, which has a high leakage resistance and a nominal maximum voltage capacity of 50 v. The Zenner diode 66 having a breakdown voltage of 50 v. is provided in shunt with the capacitor to provide a breakdown conduction path around the capacitor should, by accident, a potential in excess of the safe voltage for the capacitor be provided at the sliding tap 54. The resistor 78 and the fixed contact 80 provide a discharge path for the associated capacitor, as will be hereinafter described.

A high input impedance amplifier 100 has its high potential input terminal 102 coupled to the moving contact 84F of the stepping switch 86. The output terminal 104 of the amplifier is coupled to one end of a load resistor 106, the other end of which is coupled to the moving contact 88F of the stepping switch 86. A feed back loop 108 is coupled between the output terminal 104 and the inverted input terminal 110 of the amplifier to provide high stability and unity gain. The output terminal 104 is coupled to the input terminal of a digital voltmeter 114 which serves as an analog to digital converter. The output terminal of the voltmeter is coupled to a first input terminal 116 of a printer and punch 118. The output conductors 120 of the read-out mechanism 42 are coupled to the input terminals of a digital code converter 124, whose output terminal is coupled to a second input terminal 128 of the printer and punch 118. The punch 118 has an output terminal 130 which is energized after the punch has completed a punching operation. This terminal 130 is coupled to one end of the stepping solenoid 90 of the stepping switch 86, the other end of which is connected to ground.

It will thus be seen that the stepping switch 86 is operable to sequentially sample the potential stored on each of the capacitors 76A, 76B, 76C and 76D. Each of these potentials is passed by the high input impedance amplifier 100, without any significant discharge of the capacitor being sampled, to the digital voltmeter. The voltmeter provides the printer-punch 118 with a digital equivalent of the stored potential, which is then punched on a suitable document, such as a data card. When the punch 118 has punched a number, it energizes the stepping solenoid 90 to advance the moving contacts 84F and 88F to the next level of contacts to sample the next capacitor.

It should be noted that an alternative construction of the stepping switch may be utilized. The stepping switch may have two banks of fixed contacts, each bank having ten fixed contacts of which each of the last five contacts are respectively in parallel connection with each of the first five contacts. Thus each of the eight signal output fixed contacts of each bank will be associated with a specific test output signal, and the stepping switch will be homed only once for each readout cycle of eight tests.

A programmer module 134 is provided to control the operation of the system. Seven cams and follower switches may be utilized to provide the necessary switching functions, although other known electronic gating techniques may be alternatively used. The first cam 136 energizes the sampler advance mechanism 41 to cause it to advance a fresh sample container 16 to the off-take station 20. A second cam 138 energizes the mechanism operating the off-take tube 22 which aspirates the sample from the receptacle 16 and conveys the sample into the automatic analysis apparatus. A third cam 140 energizes the mechanism operating the optical benches to position the benches to measure the first group of flow cells or equivalent sample devices, such as spectral flames. The fourth cam 142 energizes the read-out mechanism 42 to read the identification number on the card 18 of the off-taken sample container whose sample is now approaching completion of analysis in the analysis apparatus 24; and also pulses the punch 118 to accept this information at the input terminal 128 and to punch this information on a data card. The punch complete signal advances the stepping switch to the second level. By this time the first four portions of the sample have reached their peaks in the first group of four flow cells, the four pens have charted the peak values of light received by the respective light detectors, and the four capacitors 76A, 76B, 76C and 76D have stored potentials responsive to these values. A fifth cam 144 now energizes the punch to accept the information at the input terminal 116 and to punch this information on the data card. The punch complete signal at terminal 130 advances the stepping switch to the next level, and in this manner the four capacitors are read and punched. After the fourth capacitor's stored value has been punched, the punch complete signal advances the stepping switch again, and it automatically homes to the first level. The third cam 140 now energizes the mechanism operating the optical benches to position the benches for measuring the second group of flow cells, or equivalent sample devices. A sixth cam 146 now energizes the relay 92 which moves the contacts 72 to the fixed contacts 80, to discharge the capacitors through the resistors 78, and then restores the contacts 72 to the fixed contacts 70. The fifth cam 144 again energizes the printer to read out the stored values from the capacitors and advance the stepping switch. A seventh cam 148 now energizes the printer to reset, discharge the punched card and feed a fresh card for punching the next sample; while the sixth cam again energizes the relay 92 to discharge the capacitors. A full cycle of operation has now been completed. The full cycle may be of relatively short duration depending on the analyses to be run. Blood samples have been divided into portions and analyzed for creatinine, glucose, cholesterol, total protein, albumin, S.G.O.T., uric acid and calcium, and the test results punched out on one card at a rate of two minutes for each consecutive sample. The total time in the analytic system per sample was approximately ten minutes.

If desired, an additional cam may be provided to count operations and to signal the operator to recalibrate the instrument after a given number of samples have been analyzed.

What is claimed is:

1. A liquid sample analysis apparatus comprising:

analysis means for providing a plurality of independent output signals, each signal being responsive to the concentration of a different substance in the liquid sample; a plurality of potentiometers, each coupled to said analysis means for receiving one of the plurality of output signals therefrom and for providing an output potential responsive to the concentration of the respective substance in the sample; a plurality of capacitors; a plurality of diodes, each coupling a respective one of said plurality of capacitors to a respective one of said plurality of potentiometers, each said capacitor storing the peak output potential coupled thereto from said respective potentiometer; and recording means sequentially coupled to said plurality of capacitors for recording a plurality of indicia, each indicium being responsive to the potential stored on said respective capacitor.

2. A liquid sample analysis apparatus comprising: analysis means for dividing a sample into a plurality of portions, for reacting each of the plurality of portions with respect to a different predetermined substance, including means for supplying energy to each reacted portion, to provide a light output therefrom having an intensity responsive to the concentration of the respective predetermined substance therein, and means for measuring the light intensity from each of the plurality of portions and for providing a plurality of output signals respectively responsive thereto; a plurality of potentiometers, each coupled to said analysis means for receiving one of the plurality of output signals therefrom and for providing an output potential responsive to the concentration of the respective substance in the sample; a plurality of capacitors; a plurality of diodes, each coupling a respective one of said plurality of capacitors to a respective one of said plurality of potentiometers, each said capacitor storing the peak output potential coupled thereto from said respective potentiometer; and recording means sequentially coupled to said plurality of capacitors for recording a plurality of indicia, each being responsive to the potential stored on said respective capacitor.

3. A liquid sample analysis apparatus comprising: analysis means for dividing a sample into a plurality of portions, for reacting each of the plurality of portions with respect to a different predetermined substance, including means for supplying energy to each reacted portion to provide a light output therefrom having an intensity responsive to the concentration of the respective predetermined substance therein, and means for measuring the light intensity from each of the plurality of portions and for providing a plurality of output signals respectively responsive thereto; a plurality of potentiometers, each coupled to said analysis means for receiving one of the plurality of output signals therefrom and for providing an output potential responsive to the concentration of the respective substance in the sample; a plurality of capacitors; a plurality of diodes, each coupling a respective one of said plurality of capacitors to a respective one of said plurality of potentiometers, each said capacitor storing the peak output potential coupled thereto from said respective potentiometer; and recording means coupled to said plurality of capacitors for recording a plurality of numbers, each number being responsive to the potential stored on said respective capacitors.

4. A liquid sample analysis apparatus comprising: analysis means for dividing a sample into a plurality of portions, for reacting each of the plurality of portions with respect to a different predetermined substance, including means for supplying energy to each reacted portion, to provide a light output therefrom having an intensity responsive to the concentration of the respective predetermined substance therein, and means for measuring the light intensity from each of the plurality of portions and for providing a plurality of output signals respectively responsive thereto; a plurality of potentiometers, each coupled to said analysis means for receiving one of the plurality of output signals therefrom and for providing an output potential responsive to the concentration of the respective substance in the sample; a plurality of capacitors; a plurality of diodes, each coupling a respective one of said plurality of capacitors to a respective one of said plurality of potentiometers, each said capacitor storing the peak output potential coupled thereto from said respective potentiometer; analog to digital conversion means; digital recording means coupled to said conversion means; and means for sequentially coupling said conversion means to each of said capacitors; whereby said recording means is operable to record a plurality of numbers, each number being responsive to the potential stored on said respective capacitor.

5. A liquid sample analysis apparatus comprising: a plurality of sample containers, each bearing indicia uniquely identifying the respective container, and each containing a liquid sample; analysis means for dividing a sample into a plurality of portions, for reacting each of the plurality of portions with respect to a different predetermined substance, including means for off-taking a sample from its container, means for supplying energy to each reacted portion to provide a light output therefrom having an intensity responsive to the concentration of the respective predetermined substance therein, and means for measuring the light intensity from each of the plurality of portions and for providing a plurality of output signals respectively responsive thereto; means for sequentially presenting said sample containers to said analysis means for off-taking; a plurality of potentiometers, each coupled to said analysis means for receiving one of the plurality of output signals therefrom and for providing an output potential responsive to the concentration of the respective substance in the sample; a plurality of capacitors; a plurality of diodes, each coupling a respective one of said plurality of capacitors to a respective one of said plurality of potentiometers, each said capacitor storing the peak output potential coupled thereto from said respective potentiometer; recording means; means sequentially coupling said recording means to each of said capacitors, whereby said recording means is operable to record a plurality of numbers, each number being responsive to the potential stored on said respective capacitor; means for sensing said indicia on said sample containers; and means coupling said recording means to said sensing means, whereby said recording means is operable to record a number uniquely identifying the sensed sample container.

6. Apparatus for analyzing each of a plurality of samples for a plurality of substances, comprising:
means for transmitting the samples successively as an initial flowing stream of samples;
analysis means for dividing the initial stream into a plurality of quotient streams, each quotient stream including a portion of each sample from the initial stream, the portions of each quotient stream being discrete and successive, for reacting each of the portions in each respective quotient stream with respect to a respective, predetermined, different substance, including means for supplying energy to all of the reacted portions from a common one of the samples in sequence, to provide a light output therefrom having an intensity responsive to the concentration of the respective predetermined substance therein, and means for measuring the light intensity from each of the plurality of portions from a common one of the samples and for providing a plurality of output signals respectively responsive thereto;
a plurality of potentiometers, each coupled to said analysis means for receiving one of the plurality of output signals therefrom and for providing an output potential responsive to the concentration of the respective substance in the sample;

a plurality of capacitors;

a plurality of unidirectional transmission devices, each coupling a respective one of said capacitors to a respective one of said plurality of potentiometers, each said capacitor storing the peak output potential coupled thereto from said respective potentiometer, and recording means including analogue to digital conversion means coupled to said plurality of capacitors for recording a plurality of digitized numbers, each number being responsive to the potential stored on said respective capacitor.

7. Apparatus according to claim 6, wherein each of said capacitors receives its signal once in a cycle, there being one cycle for the portions from each sample.

8. Apparatus according to claim 6, wherein each of said sample containers bears indicia uniquely identifying the container, and including means coupled to said recording means for sensing the indicia on the sample containers, whereby said recording means records a number uniquely identifying the sensed sample container.

References Cited
UNITED STATES PATENTS

| | | | |
|---|---|---|---|
| 2,490,674 | 12/1949 | Christ et al. | 346—33 X |
| 3,095,728 | 7/1963 | Kindred et al. | 73—23.1 |
| 3,353,444 | 11/1967 | Theiring | 88—14 |

RICHARD B. WILKINSON, *Primary Examiner.*

JOSEPH W. HARTARY, *Assistant Examiner.*

U.S. Cl. X.R.

88—14